United States Patent
Narayana et al.

(10) Patent No.: US 8,553,351 B1
(45) Date of Patent: Oct. 8, 2013

(54) DISK DRIVE CORRECTING TRACK ID IN RESPONSE TO AN ESTIMATED RADIAL LOCATION AND A BURST PES

(75) Inventors: Aswartha Narayana, Aliso Viejo, CA (US); Chuanwen Ji, Irvine, CA (US); Duc T. Phan, Saratoga, CA (US); Min Chen, San Jose, CA (US); Hengchang Guo, Rancho Santa Margarita, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 182 days.

(21) Appl. No.: 13/267,196

(22) Filed: Oct. 6, 2011

(51) Int. Cl.
*G11B 21/02* (2006.01)

(52) U.S. Cl.
USPC .......................................... 360/75; 360/77.08

(58) Field of Classification Search
None
See application file for complete search history.

(56) References Cited

U.S. PATENT DOCUMENTS

| | | | |
|---|---|---|---|
| 5,852,522 A | 12/1998 | Lee | |
| 6,078,452 A | 6/2000 | Kittilson et al. | |
| 6,226,138 B1 | 5/2001 | Blaum et al. | |
| 6,384,997 B1 | 5/2002 | Wu et al. | |
| 6,392,831 B1 | 5/2002 | Yeo et al. | |
| 6,710,953 B1 | 3/2004 | Vallis et al. | |
| 6,735,040 B2 | 5/2004 | Galloway et al. | |
| 7,050,249 B1 | 5/2006 | Chue et al. | |
| 7,099,095 B1 | 8/2006 | Subrahmanyam et al. | |
| 7,184,230 B1 | 2/2007 | Chue et al. | |
| 7,369,343 B1 | 5/2008 | Yeo et al. | |
| 7,518,819 B1 | 4/2009 | Yu et al. | |
| 7,589,926 B2 | 9/2009 | Richmond et al. | |
| 7,800,853 B1 | 9/2010 | Guo et al. | |

*Primary Examiner* — Paul Huber

(57) ABSTRACT

A disk drive is disclosed comprising a head actuated over a disk, the disk comprising a plurality of servo tracks defined by a plurality of servo sectors. An estimated radial location of the head is generated in response to an actuator control signal. A Gray coded track ID is detected from reading a servo sector, and decoded into a detected track ID. A burst position error signal (PES) is generated from reading servo bursts in the servo sector, wherein the burst PES represents a detected fractional servo track offset of the head. When the detected track ID is corrupt, a corrected track ID is generated using the estimated radial location and the burst PES, and the actuator control signal is adjusted in response to the corrected track ID and the burst PES.

8 Claims, 4 Drawing Sheets

|(DETECTED LOCATION) − (ESTIMATED LOCATION)| > Th ⇒ DETECTED TRACK ID CORRUPT

DISK DRIVE CORRECTING TRACK ID IN RESPONSE TO AN ESTIMATED RADIAL LOCATION AND A BURST PES

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track ID) which is read by the head and processed by a servo controller to control the velocity of the actuator arm as it seeks from track to track.

FIG. 1 shows a prior art format of a disk 2 comprising a plurality of concentric tracks 4 having embedded servo sectors $6_0$-$6_N$. Each servo sector (e.g., servo sector $6_4$) comprises a preamble 8 for synchronizing gain control and timing recovery, a sync mark 10 for synchronizing to a data field 12 comprising the coarse head positioning information (such as a Gray coded track ID), and servo bursts 14 which provide fine head positioning information.

As the head passes over a servo sector, the head positioning information is processed to estimate the radial location of the head. The servo controller may comprise a state estimator which processes the detected head position as well as the VCM control signal to estimate various states of the head, such as its position, velocity, and acceleration. The estimated states may be compared to target values in a seek profile, wherein the error between the estimated states and target states is processed to generate a control signal applied to the VCM in order to move the head in a direction and velocity that reduces the error.

If the disk surface comprises defective servo sectors (which may be detected during a manufacturing procedure), the associated wedges of user data may be relocated to spare data sectors, or the entire data track may be relocated to a spare data track. However, relocating data wedges and/or data tracks is undesirable since it reduces the overall capacity of the disk and may also impact performance when seeking to the spare data wedges or spare data tracks. The state estimator in the servo controller will typically filter out misdetected servo sectors during seek operations; however, if multiple sequential servo sectors are misdetected during a seek, it may degrade performance by increasing the settle time. In addition, if the servo controller encounters a misdetected servo sector while tracking the centerline of a data track during an access operation, the operation may be aborted and retried (particularly during write operations) which impacts performance due to the slipped revolutions.

DETAILED DESCRIPTION OF EMBODIMENTS OF THE INVENTION

Figure 1:
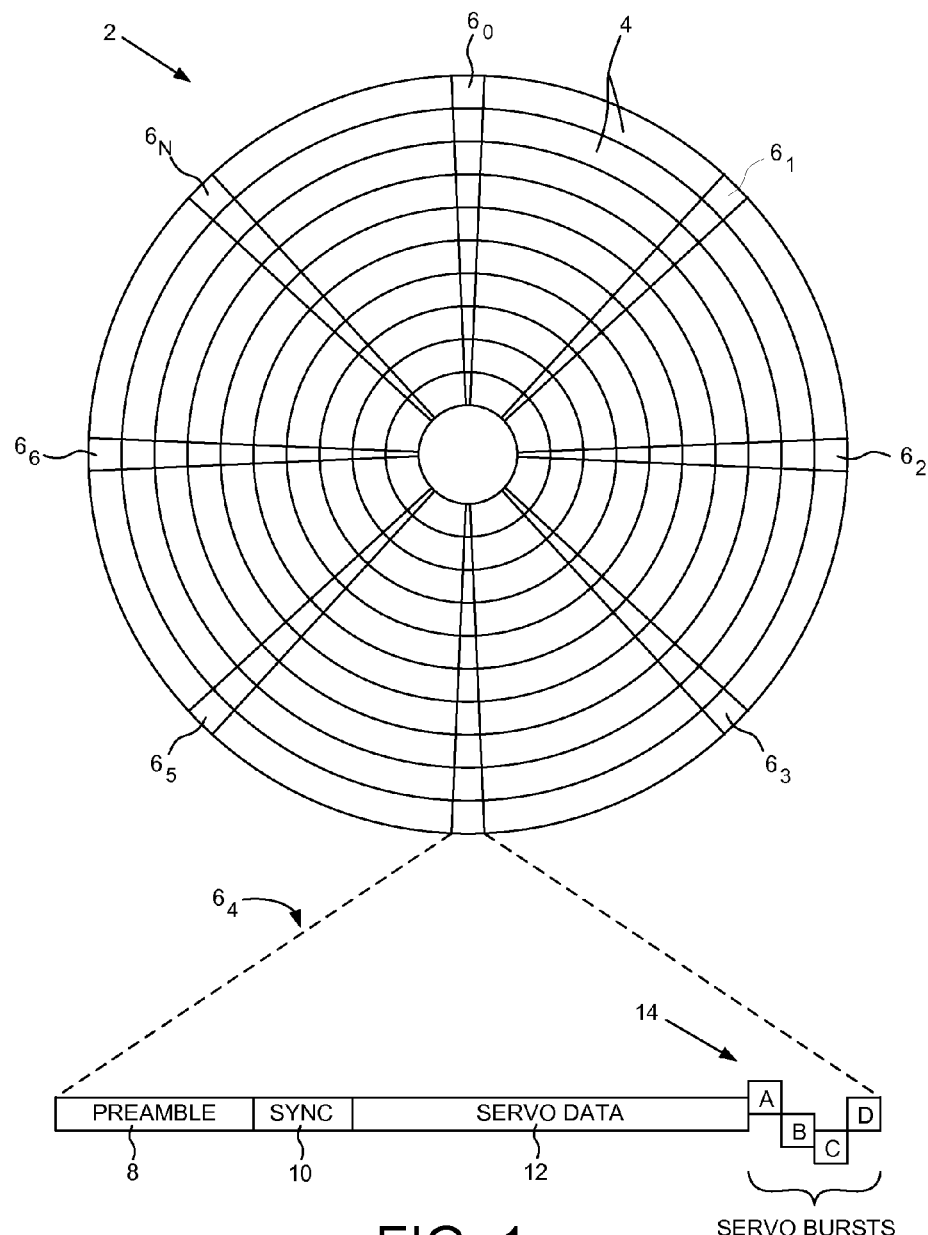
FIG. 1 shows a prior art disk format comprising a plurality of servo tracks defined by embedded servo sectors.
Figure 2A:
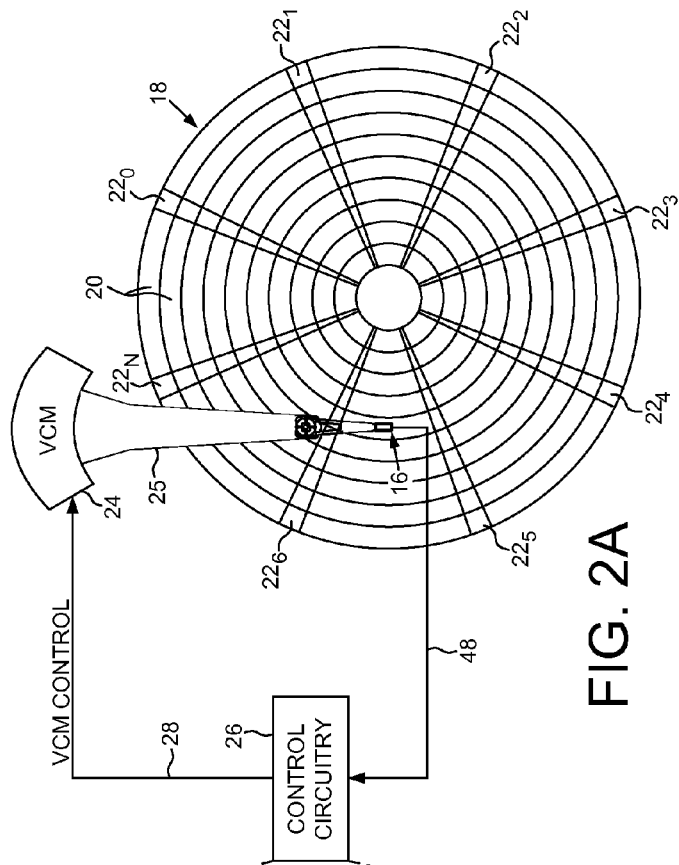
FIG. 2A shows a disk drive according to an embodiment of the present invention comprising a head actuated over a disk by a VCM.
Figure 2B:
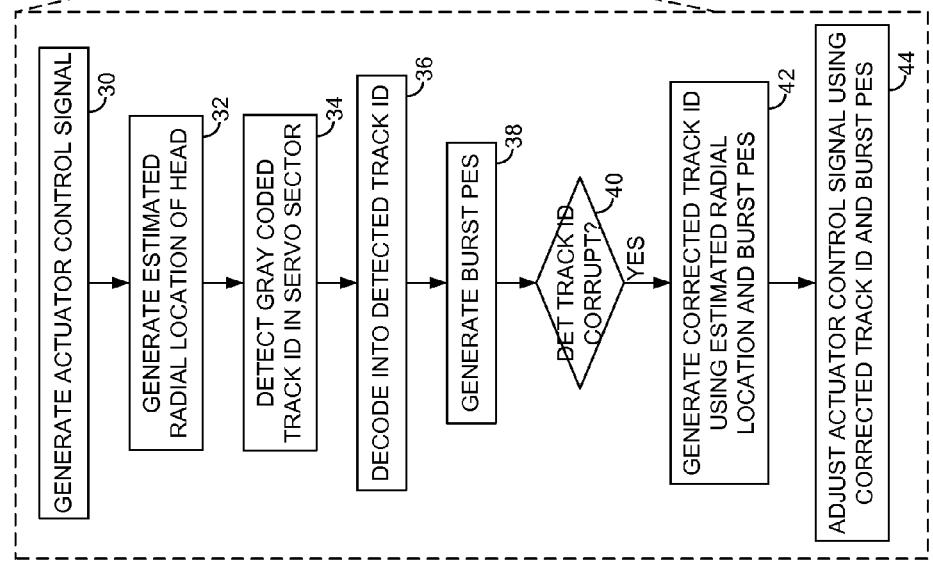
FIG. 2B is a flow diagram according to an embodiment of the present invention wherein when a detected track ID is corrupt, a corrected track ID is generated using an estimated radial location and a burst PES generated from reading the servo bursts in a servo sector.

FIG. 2A shows a disk drive according to an embodiment of the present invention comprising a head 16 and a disk 18 comprising a plurality of servo tracks 20 defined by a plurality of servo sectors $22_0$-$22_N$, wherein each servo sector comprises a Gray coded track ID and servo bursts (similar to FIG. 1). The disk drive further comprises an actuator (e.g., a voice coil motor (VCM) 24) for actuating the head 16 over the disk 18. Control circuitry 26 within the disk drive executes the flow diagram of FIG. 2B, wherein an actuator control signal is generated and applied to the actuator (step 30). An estimated radial location of the head is generated in response to the VCM control signal (step 32), and a Gray coded track ID is detected from reading one of the servo sectors (step 34). The detected Gray coded track ID is decoded into a detected track ID (step 36). A burst position error signal (PES) is generated from reading the servo bursts in the servo sector (step 38), wherein the burst PES represents a detected fractional servo track offset of the head. When the detected track ID is corrupt (step 40), a corrected track ID is generated using the estimated radial location and the burst PES (step 42), and the actuator control signal is adjusted in response to the corrected track ID and the burst PES (step 44).

In the embodiment of FIG. 2A, the head 16 is coupled to the distal end of an actuator arm 25 rotated about a pivot by the VCM 24. In one embodiment, the disk drive may also include a suitable microactuator, such as a piezoelectric (PZT) actuator, for actuating the head 16 radially over the disk in fine movements, whereas the VCM 24 may actuate the head radially over the disk in coarse movements. The microactuator may be implemented in the disk drive in any suitable manner, such as a microactuator that moves a suspension relative to the actuator arm, and/or a microactuator that moves a head gimbal relative to the suspension. In one embodiment, the estimated radial location may be generated at step 32 of FIG. 2B in response to a VCM control signal and/or in response to a microactuator control signal.

In the embodiment of FIG. 2A, the servo sectors $22_0$-$22_N$ may comprise any suitable pattern of servo bursts, such as the amplitude based quadrature pattern shown in FIG. 1, or a suitable phase based servo pattern. The control circuitry 26 comprises a suitable read channel 46 (FIG. 3A) for processing the read signal 48 emanating from the head 16 in order to detect and decode 50 the Gray coded track ID into a detected track ID 52, and demodulate 54 the servo bursts into the burst PES 56. The Gray coded track ID in a servo sector may be corrupt due, for example, to a defect on the disk that prevents the read channel from accurately decoding the Gray coded track ID into the detected track ID 52. For this reason, a state estimator 58 processes the VCM control signal 28 in order to generate an estimated radial location 60 of the head, wherein an estimated track ID can be derived from the estimated radial location and used to replace the detected track ID 52. Since the burst PES 56 is typically not corrupted by a media defect, the estimated track ID may be combined 62 with the burst PES 56 to generate an estimated location 64 of the head. In one embodiment, the estimated location 64 is generated by multiplying the estimated track ID by a value representing a number of steps between consecutive servo tracks, and adding 62 the result to the burst PES 56. A suitable control signal generator 66 compares the estimated location 64 of the head to a reference location 68 (e.g., generated relative to a seek profile 70), wherein the difference represents the PES for generating the VCM control signal 28 (after suitable compensation filtering).

Figures 3A, 3B:
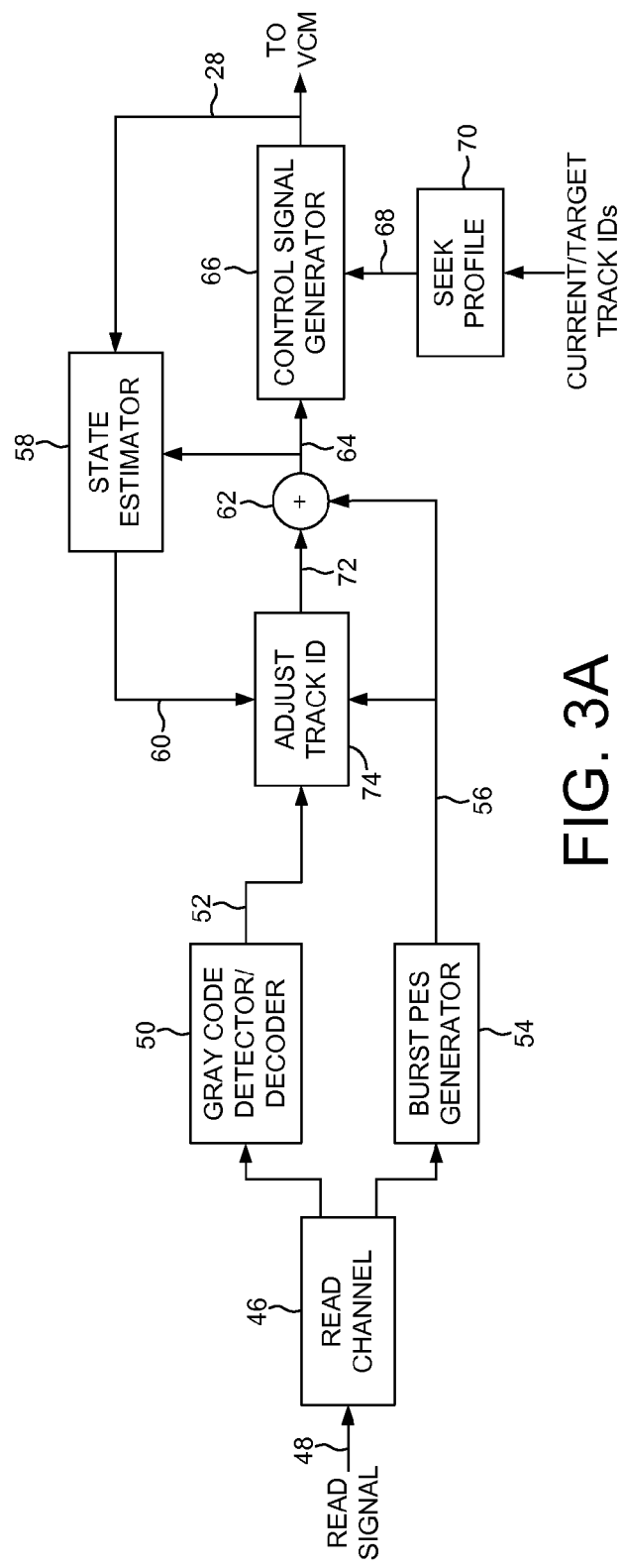
FIG. 3A shows control circuitry according to an embodiment of the present invention for generating the corrected track ID when the detected track ID is corrupt.
FIG. 3B shows an embodiment of the present invention wherein the detected track ID is determined to be corrupt when a difference between a detected radial location and an estimated radial location exceeds a threshold.

In one embodiment illustrated in FIG. 3B, the control circuitry may determine that the detected track ID is corrupt based on a difference between the detected radial location (based on the detected track ID 52 and the burst PES 56), and the estimated radial location 60. For example, the detected track ID 52 may be considered corrupt when the difference exceeds a threshold as illustrated in FIG. 3B.

The estimated radial location 60 of the head generated by the state estimator 58 may be off from the actual radial location of the head, and therefore the estimated track ID derived from the estimated radial location may be incorrect. Since a defect that corrupts the Gray coded track ID typically does not corrupt the servo bursts, and therefore the burst PES 56 is typically still accurate, the burst PES 56 can be used to correct the estimated track ID. In the embodiment of FIG. 3A, the control circuitry generates a corrected track ID 72 by adjusting 74 the estimated radial location 60 using the burst PES 56. In one embodiment, the corrected track ID 72 is generated by subtracting the burst PES 56 from the estimated radial location 60, and integer dividing the result by the value representing the number of steps between consecutive servo tracks.

Figure 4A:
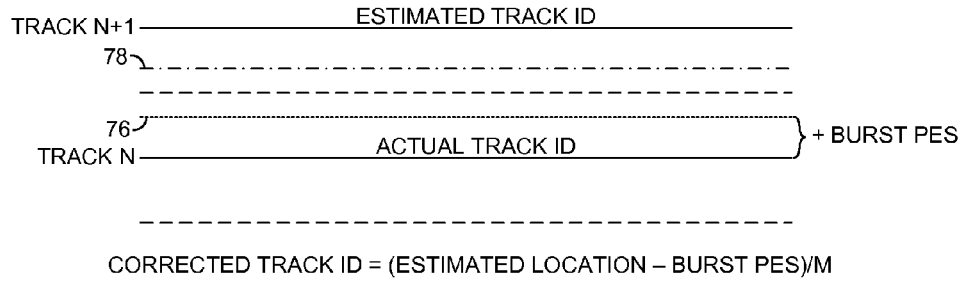
FIG. 4A shows an example of generating the corrected track ID by subtracting the burst PES from the estimated radial location.

An example of this embodiment is illustrated in FIG. 4A which shows an actual radial location 76 of the head and the estimated radial location 78 generated by the state estimator. The estimated track ID corresponding to the estimated radial location 78 is TRACK N+1 whereas the correct track ID corresponding to the actual radial location 76 of the head is TRACK N. The burst PES detected from reading the servo bursts is a positive value (+BURST PES) relative to the actual track. Subtracting this value from the estimated radial location 78, and then integer dividing by the number of steps (M) between consecutive servo tracks will result in the correct track ID of TRACK N.

Figure 4B:
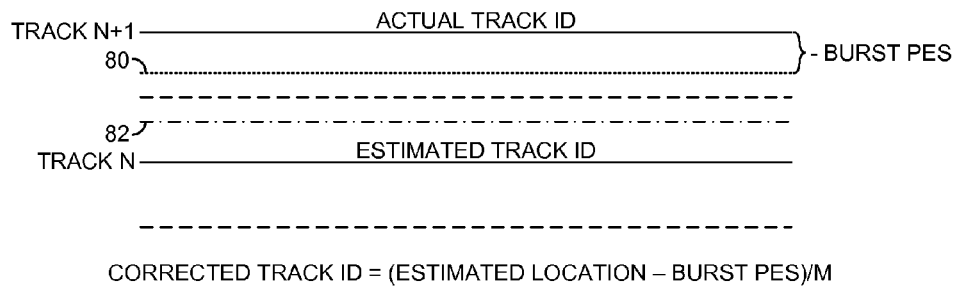
FIG. 4B shows another example of generating the corrected track ID by subtracting the burst PES from the estimated radial location.

FIG. 4B illustrates another example of an actual radial location 80 and an estimated radial location 82 including an incorrect estimated track ID of TRACK N and a correct track ID of TRACK N+1. In this example, the burst PES detected from reading the servo bursts is a negative value (−BURST PES) relative to the actual track, and therefore subtracting this negative value increases the estimated radial location 82 so that the correct track ID of TRACK N+1 is generated after integer dividing by M.

Figure 4C:
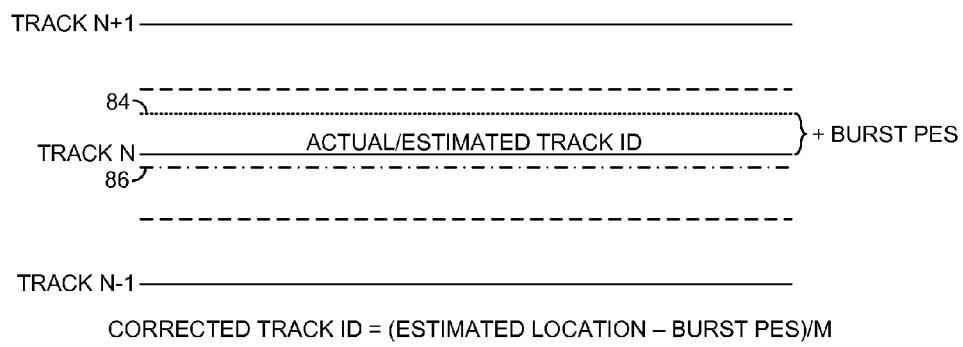
FIG. 4C shows an example wherein subtracting the burst PES from the estimated radial location will still result in the correct track ID even though no correction is needed.

FIG. 4C illustrates an example of an actual radial location 84 and an estimated radial location 86 that both correspond to the correct track ID of TRACK N. However, when the burst PES (+BURST PES) is subtracted from the estimated radial location 86, integer dividing by M will still result in the correct track ID of TRACK N. This will be true as long as the difference between the actual radial location and the estimated radial location is less than half a servo track. Similarly, an incorrect estimated track ID can be corrected as shown in FIGS. 4A and 4B as long as the difference between the actual radial location and the estimated radial location is less than half a servo track. If the difference exceeds half a servo track, the track ID will be miscorrected. However, the state estimator is typically accurate to within half a servo track of the actual location during track follow mode, and therefore the estimated track ID is typically corrected without error.

Referring again to FIG. 3A, the corrected track ID 72 is combined with the burst PES 56 to generate the estimated location 64 of the head processed by the control signal generator 66 as described above. Accordingly, the burst PES can be used to correct the estimated track ID as well as generate the estimated location 64 of the head used to servo the head over the disk, thereby improving performance over a system that does not attempt to correct the estimated track ID.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of servo tracks defined by a plurality of servo sectors, each servo sector comprising a Gray coded track ID and servo bursts;
   a head;
   an actuator for actuating the head over the disk; and
   control circuitry operable to:
     generate an actuator control signal applied to the actuator;
     generate an estimated radial location of the head in response to the actuator control signal;
     detect a Gray coded track ID from reading one of the servo sectors;
     decode the detected Gray coded track ID into a detected track ID;
     generate a burst position error signal (PES) from reading the servo bursts in the servo sector, wherein the burst PES represents a detected fractional servo track offset of the head; and
     when the detected track ID is corrupt:
       generate a corrected track ID using the estimated radial location and the burst PES; and adjust the actuator control signal in response to the corrected track ID and the burst PES.

2. The disk drive as recited in claim 1, wherein the control circuitry is operable to determine the detected track ID is corrupt based on a difference between a detected radial location based on the detected track ID and the burst PES, and the estimated radial location.

3. The disk drive as recited in claim 1, wherein the control circuitry is operable to generate the corrected track ID by subtracting the burst PES from the estimated radial location.

4. The disk drive as recited in claim 1, wherein the control circuitry is operable to generate the corrected track ID by subtracting the burst PES from the estimated radial location and integer dividing the result by a value representing a number of steps between consecutive servo tracks.

5. A method of operating a disk drive, the disk drive comprising a head and a disk, the disk comprising a plurality of servo tracks defined by a plurality of servo sectors, each servo sector comprising a Gray coded track ID and servo bursts, the method comprising:
  generating an actuator control signal for actuating the head over the disk;
  generating an estimated radial location of the head in response to the actuator control signal;
  detecting a Gray coded track ID from reading one of the servo sectors;
  decoding the detected Gray coded track ID into a detected track ID;
  generating a burst position error signal (PES) from reading the servo bursts in the servo sector, wherein the burst PES represents a detected fractional servo track offset of the head; and
  when the detected track ID is corrupt:
    generating a corrected track ID using the estimated radial location and the burst PES; and
    adjusting the actuator control signal in response to the corrected track ID and the burst PES.

6. The method as recited in claim 5, further comprising determining the detected track ID is corrupt based on a difference between a detected radial location based on the detected track ID and the burst PES, and the estimated radial location.

7. The method as recited in claim 5, further comprising generating the corrected track ID by subtracting the burst PES from the estimated radial location.

8. The method as recited in claim 5, further comprising generating the corrected track ID by subtracting the burst PES from the estimated radial location and integer dividing the result by a value representing a number of steps between consecutive servo tracks.

* * * * *